(12) United States Patent
Nantais et al.

(10) Patent No.: US 8,376,073 B2
(45) Date of Patent: Feb. 19, 2013

(54) VEHICLE RADIATOR STRUCTURE

(75) Inventors: Jason Nantais, Royal Oak, MI (US); Takayoshi Harada, Commerce, MI (US)

(73) Assignee: Nissan North America, Inc., Franklin, TN (US)

(*) Notice: Subject to any disclaimer, the term of this patent is extended or adjusted under 35 U.S.C. 154(b) by 194 days.

(21) Appl. No.: 12/713,914

(22) Filed: Feb. 26, 2010

(65) Prior Publication Data

US 2011/0209935 A1    Sep. 1, 2011

(51) Int. Cl.
*B60K 11/04* (2006.01)
(52) U.S. Cl. .................................................. 180/68.4
(58) Field of Classification Search .............. 180/68.4, 180/68.6; 165/149, 148
See application file for complete search history.

(56) References Cited

U.S. PATENT DOCUMENTS

| | | | |
|---|---|---|---|
| 4,420,058 A | 12/1983 | Sato et al. | |
| 5,348,079 A | 9/1994 | Tanaka | |
| 6,167,946 B1 * | 1/2001 | Uchikawa et al. | 165/71 |
| 6,513,579 B1 | 2/2003 | Kent et al. | |
| 6,684,937 B2 * | 2/2004 | Lenz et al. | 165/41 |
| 6,705,387 B2 * | 3/2004 | Kokubunji et al. | 165/67 |
| 7,040,380 B1 * | 5/2006 | O'Brien | 165/67 |
| 7,044,203 B2 * | 5/2006 | Yagi et al. | 165/122 |
| 7,051,789 B2 * | 5/2006 | Sheppard | 165/67 |
| 7,117,927 B2 * | 10/2006 | Kent et al. | 165/67 |
| 7,243,751 B2 * | 7/2007 | Shigematsu | 180/68.4 |
| 7,267,159 B2 * | 9/2007 | Iwasaki et al. | 165/67 |
| 7,367,379 B2 * | 5/2008 | Heine | 165/67 |
| 7,552,757 B2 * | 6/2009 | Hassdenteufel et al. | 165/67 |
| 7,640,966 B2 * | 1/2010 | Maeda et al. | 165/41 |
| 7,942,223 B2 * | 5/2011 | Obayashi et al. | 180/68.4 |
| 2008/0308332 A1 | 12/2008 | Gonzalez-Salvador | |

* cited by examiner

*Primary Examiner* — John Walters
*Assistant Examiner* — James Triggs
(74) *Attorney, Agent, or Firm* — Global IP Counselors, LLP (57) ABSTRACT

A vehicle radiator structure includes a radiator core, a first fluid tank, a second fluid tank, a first lift assist contact member and a second lift assist contact member. The radiator core has a cooling fin portion. The first and second fluid tanks are fluidly coupled to the radiator core. The first lift assist contact member extends from the first fluid tank with at least a portion of the first lift assist contact member being disposed directly vertically beneath the first fluid tank in a vehicle installed position of the vehicle radiator structure. The second lift assist contact member is separate and spaced apart from the first lift assist contact member, and extends from the second fluid tank with at least a portion of the second lift assist contact member being in lateral alignment with the first lift assist contact member and the radiator core.

23 Claims, 14 Drawing Sheets

FIG. 25

VEHICLE RADIATOR STRUCTURE

BACKGROUND

1. Field of the Invention

The present invention generally relates to a vehicle radiator structure. More specifically, the present invention relates to a vehicle radiator structure having at least one lift assist contact member that is positioned to protect the radiator core from contact by a lift assist during installation of the vehicle radiator structure into the vehicle.

2. Background Information

During assembly of a vehicle, such as an automobile or van, the component typically referred to as a front end module (FEM) is assembled outside of the vehicle, and then installed as a single unit into the vehicle. Typically, an FEM includes a radiator core having cooling fins, and the FEM is encased in a frame structure before installation into the vehicle. To install an FEM into a vehicle, manufacturing workers use, for example, a lift assist machine which has arms configured to lift the heavy FEM that is encased in the frame structure, and then lower the FEM into an installation position within the engine compartment of the vehicle. The FEM is then secured in the engine compartment by bolts, rivets or any other suitable fastening mechanisms.

The type of FEM that is commonly installed in a vehicle has a size that prevents or inhibits the conventional practice of encasing the FEM in a frame structure before installation into the van. However, without the conventional frame structure, the arms of the lift assist machine can typically contact the cooling fin portion of the radiator core. Such contact can damage or bend the cooling fins during installation of the FEM into the van, thereby decreasing the efficiency and operability of the radiator.

In view of the above, it will be apparent to those skilled in the art from this disclosure that there exists a need for an improved FEM which is configured to prevent or at least minimize damage to the radiator cooling fins without the use of a frame structure as in conventional FEMs. This invention addresses this need in the art as well as other needs, which will become apparent to those skilled in the art from this disclosure.

SUMMARY

One object of the present invention is to avoid or minimize damage to the cooling fin portion of a radiator core during installation of the radiator core into a vehicle.

In accordance with an embodiment of the present invention, a vehicle radiator structure is provided that mainly includes a radiator core, a first fluid tank, a second fluid tank, a first lift assist contact member and a second lift assist contact member. The radiator core has a first end, a second end, a cooling fin portion disposed between the first and second ends. The first fluid tank is fluidly coupled to the first end of the radiator core. The second fluid tank is fluidly coupled to the second end of the radiator core. The first lift assist contact member extends from the first fluid tank with at least a portion of the first lift assist contact member being disposed directly vertically beneath the first fluid tank in a vehicle installed position of the vehicle radiator structure. The second lift assist contact member is separate and spaced apart from the first lift assist contact member. The second lift assist contact member extends from the second fluid tank with at least a portion of the second lift assist contact member being in lateral alignment with the first lift assist contact member and the radiator core.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
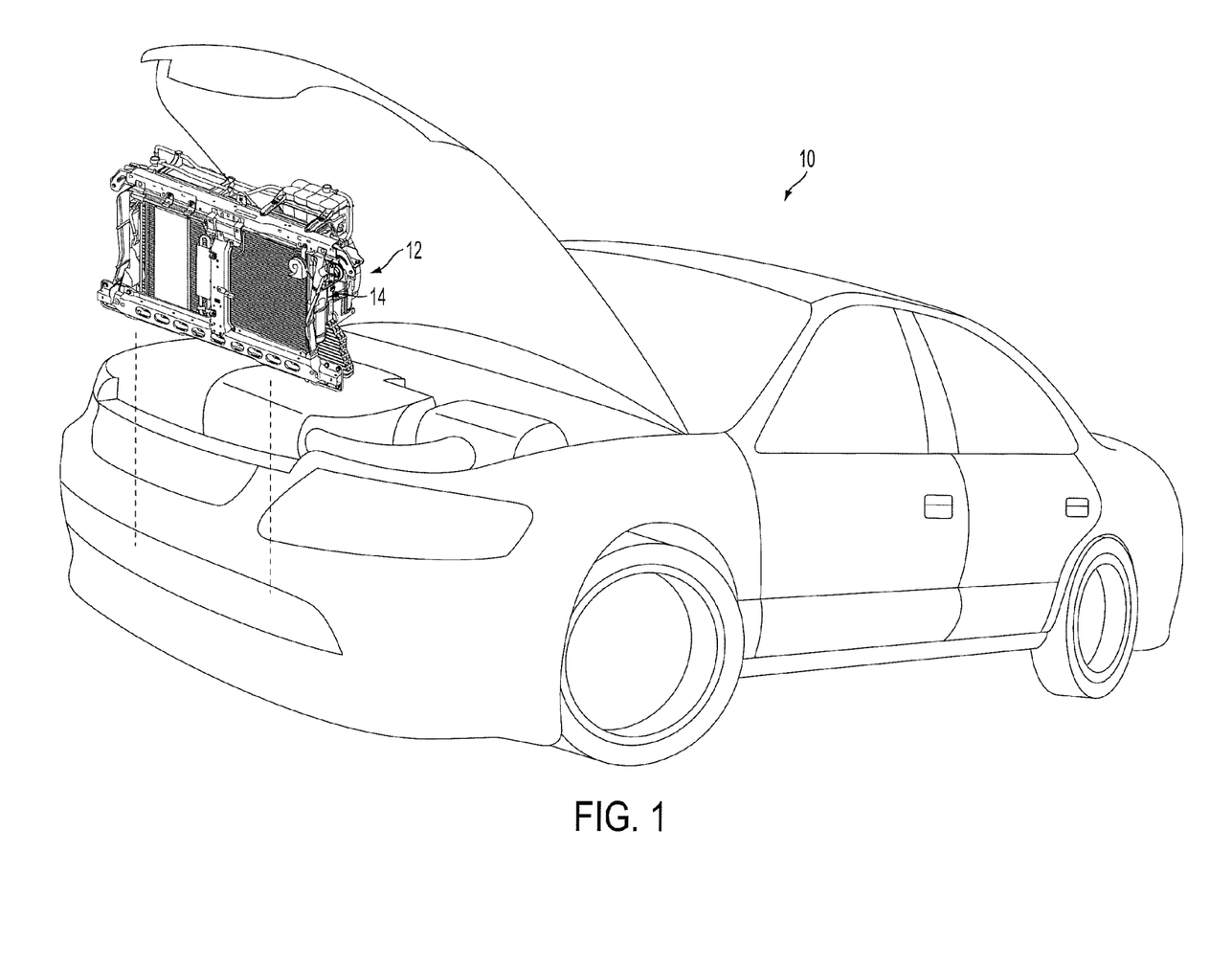
FIG. 1 is a perspective view of a vehicle including a front end module (FEM) in accordance with one illustrated embodiment.
Figure 2:
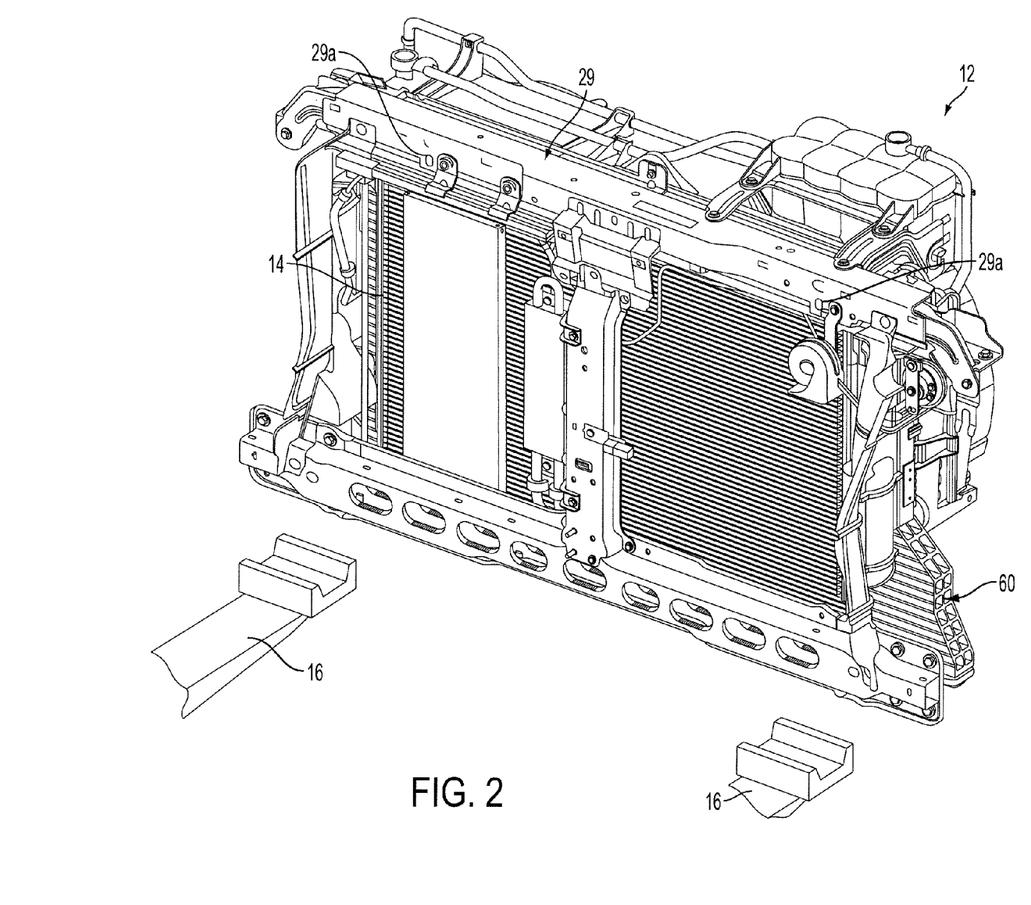
FIG. 2 is a perspective view of the FEM shown in FIG. 1 in accordance with the illustrated embodiment.
Figure 3:
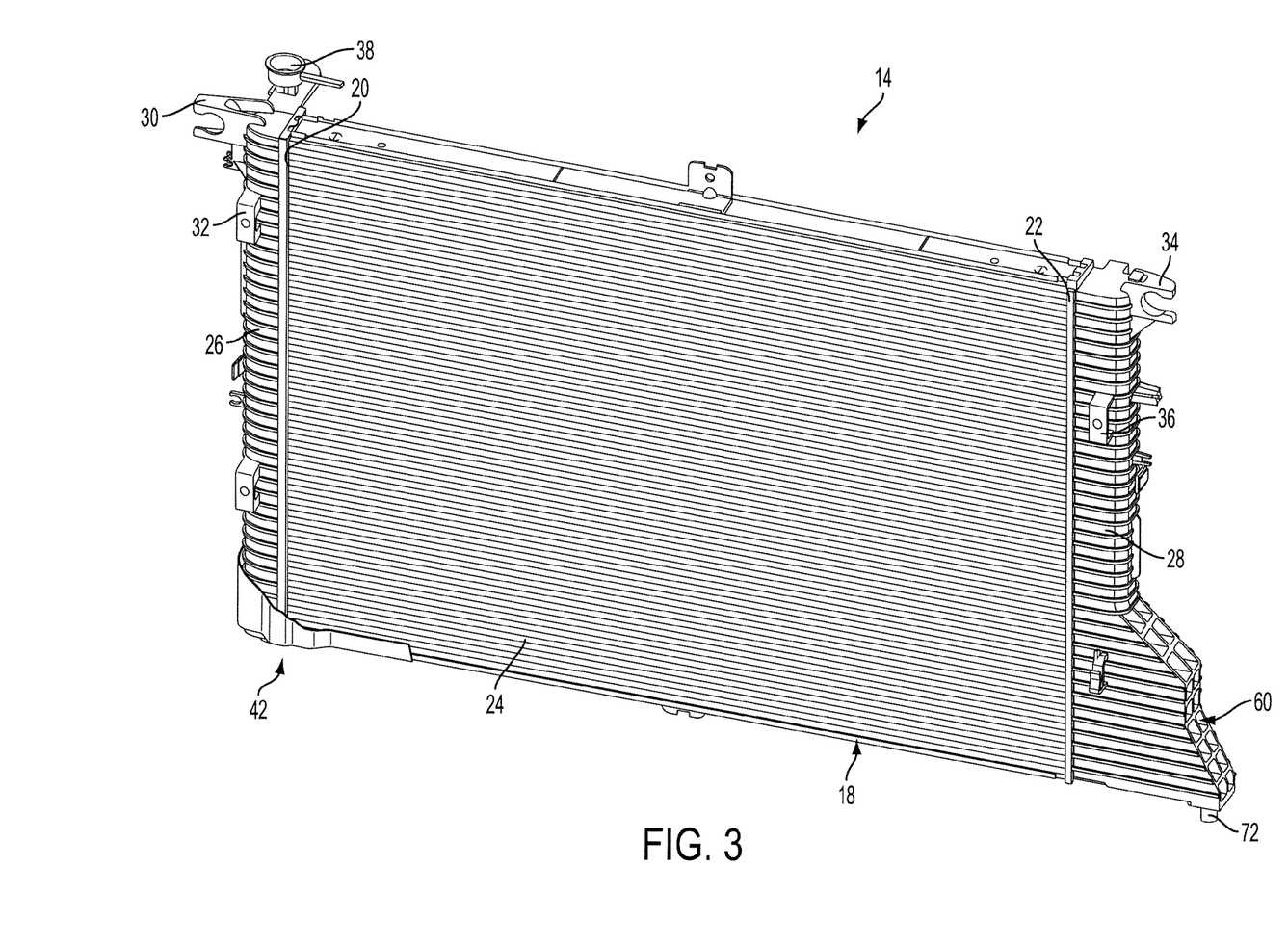
FIG. 3 is a perspective view of the radiator structure of the FEM shown in FIGS. 1 and 2 in accordance with the illustrated embodiment.
Figure 4:
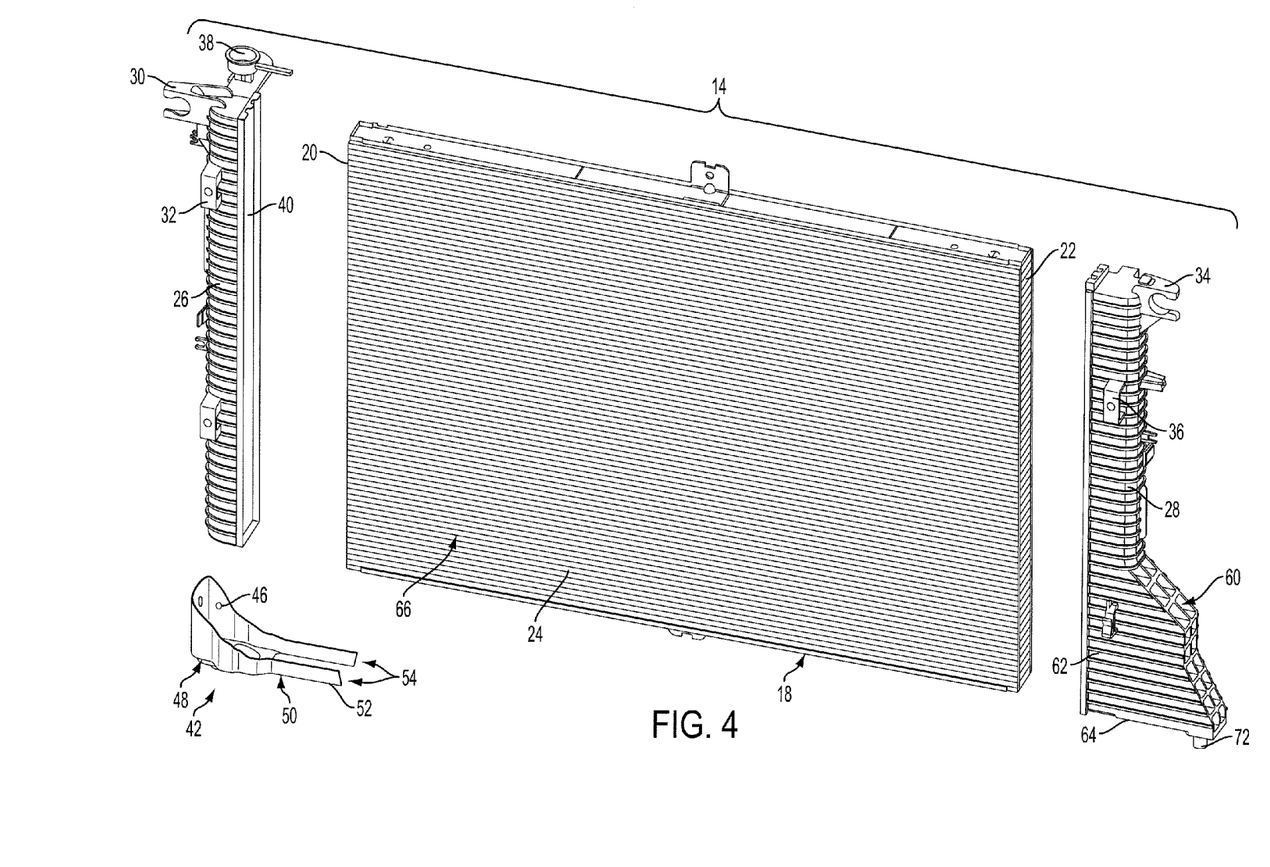
FIG. 4 is an exploded perspective view of the radiator structure shown in FIG. 3 in accordance with the illustrated embodiment.

Referring initially to FIG. 1, a vehicle 10, such as a car, van, truck or other vehicle, is illustrated in accordance with a first embodiment. The vehicle 10 includes a front end module (FEM) 12 that includes a vehicle radiator structure 14. As shown in more detail in FIG. 2, the FEM 12 also includes other components such as metal brackets and framing, a condenser unit, a radiator overflow tank, various tubing and wiring, and so on, which are conventional in the art and thus will not be discussed any further in detail. As discussed in the Background section above, a lift assist device 16 is often operated to install the FEM 12 into the vehicle 10. The lift assist device 16 can be a fork lift or any other suitable apparatus.

Further details of an exemplary radiator structure 14 are illustrated in FIGS. 3-6. As shown, the radiator structure 14 includes a radiator core 18 having a first end 20, a second end 22, and a cooling fin portion 24 disposed between the first end 20 and second end 22. The radiator structure 14 further includes a first fluid tank 26 and a second fluid tank 28. The first fluid tank 26 is fluidly coupled to the first end 20 of the radiator core 18. The second fluid tank 28 is fluidly coupled to the second end 22 of the radiator core 18. In particular, the cooling fin portion 24 is a conventional metal cooling structure that forms a coolant flow path between the first and second fluid tanks 26 and 28. The first and second fluid tanks 26 and 28 in this example are made of plastic or any other suitable material as known in the art. The radiator structure 14 is fixed to a frame 29 of the FEM 12 that does not fully enclose and/or protect the top and bottom edges of the radiator core 18. The upper horizontal frame member of the frame 29 has a pair of openings 29a for receiving pins (not shown) of the lift assist device 16. The pins (not shown) of the lift assist device 16 stabilize and lift the FEM 12 during installation of the FEM 12. FIG. 1 illustrates the location of the FEM 12 with respect to the vehicle 10. However, during installation of the FEM 12 into the vehicle 10, the front end of the vehicle 10 would be normally removed. In particular, the FEM 12 would usually be installed by moving the FEM 12 horizontally in between the front ends of the hood ledges of the vehicle 10, and then lowering the FEM 12 into its installation position.

Figures 11, 12:
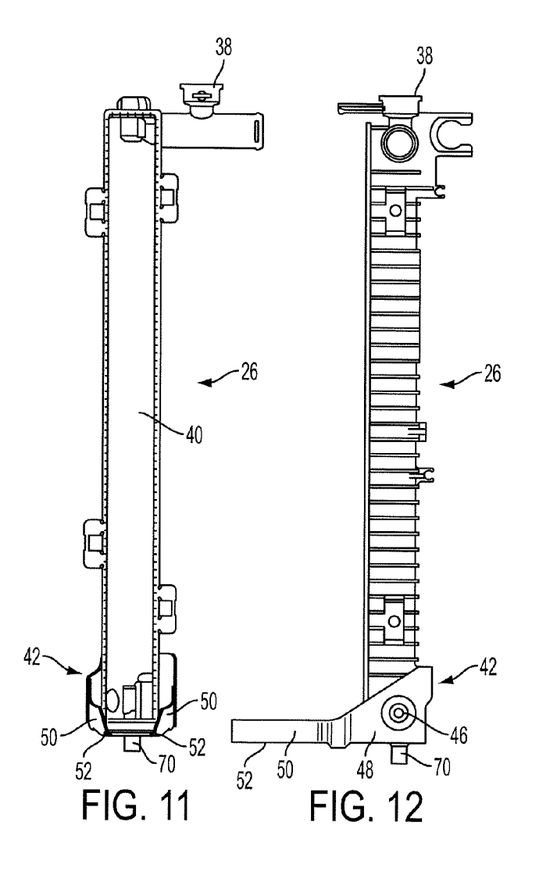
FIG. 11 is a right plan view of the left side tank of the radiator structure shown in FIG. 3 in accordance with the illustrated embodiment.
FIG. 12 is a rear plan view of the left side tank of the radiator structure shown in FIG. 3 in accordance with the illustrated embodiment.
Figure 13:
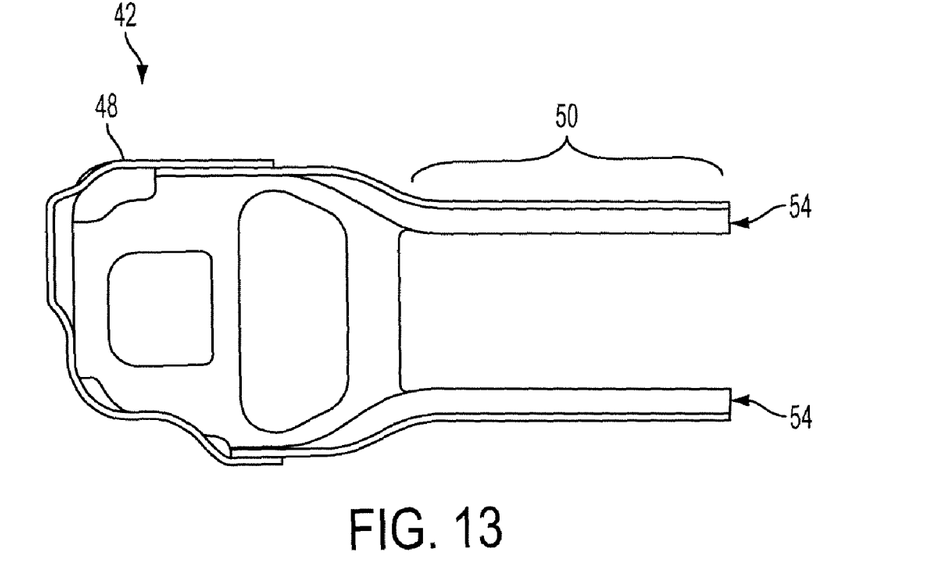
FIG. 13 is a top plan view of the lift assist contact bracket attached to the left side tank of the radiator structure shown in FIG. 3 in accordance with the illustrated embodiment.
Figure 14:
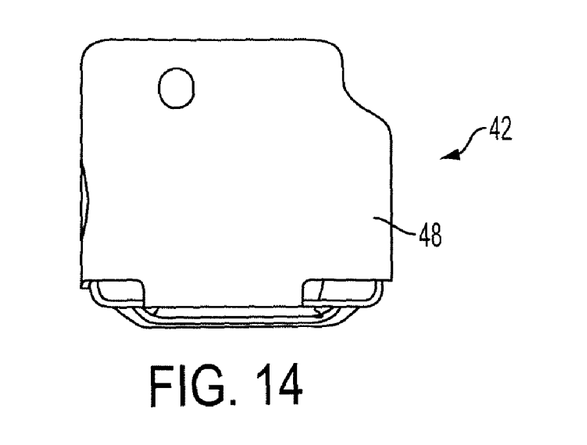
FIG. 14 is a left plan view of the lift assist contact bracket attached to the left side tank of the radiator structure shown in FIG. 3 in accordance with the illustrated embodiment.
Figure 15:
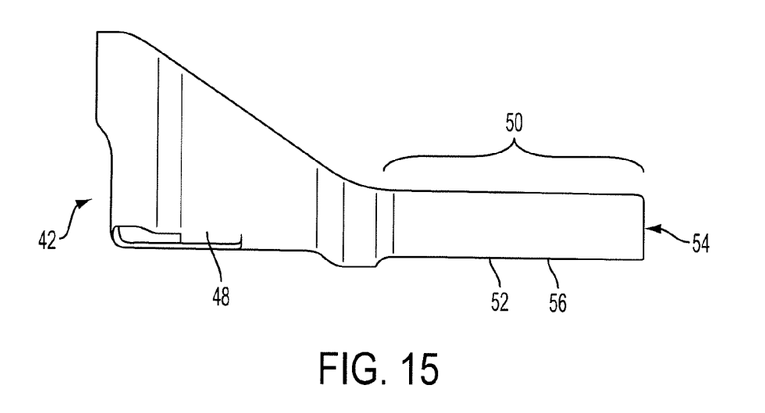
FIG. 15 is a front plan view of the lift assist contact bracket attached to the left side tank of the radiator structure shown in FIG. 3 in accordance with the illustrated embodiment.
Figure 16:
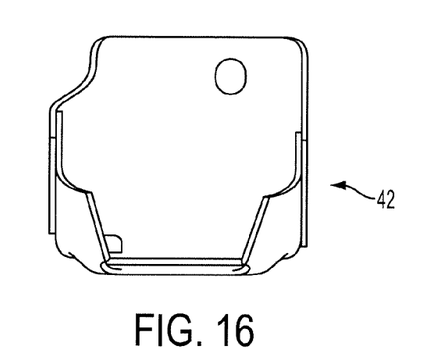
FIG. 16 is a right plan view of the lift assist contact bracket attached to the left side tank of the radiator structure shown in FIG. 3 in accordance with the illustrated embodiment.
Figure 17:
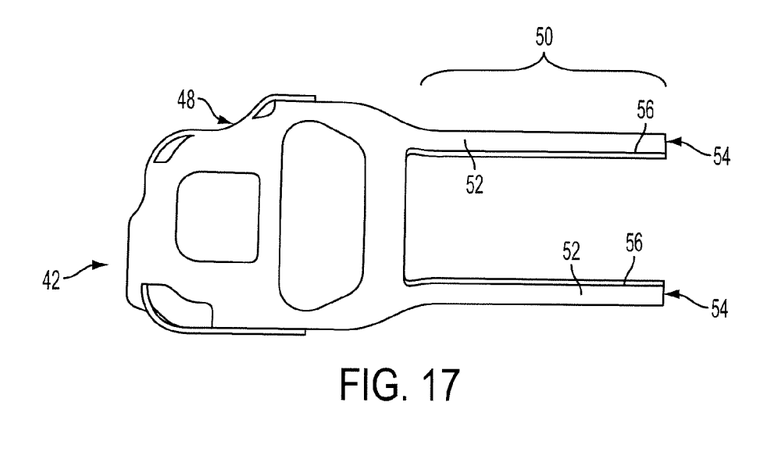
FIG. 17 is a bottom plan view of the lift assist contact bracket attached to the left side tank of the radiator structure shown in FIG. 3 in accordance with the illustrated embodiment.
Figure 18:
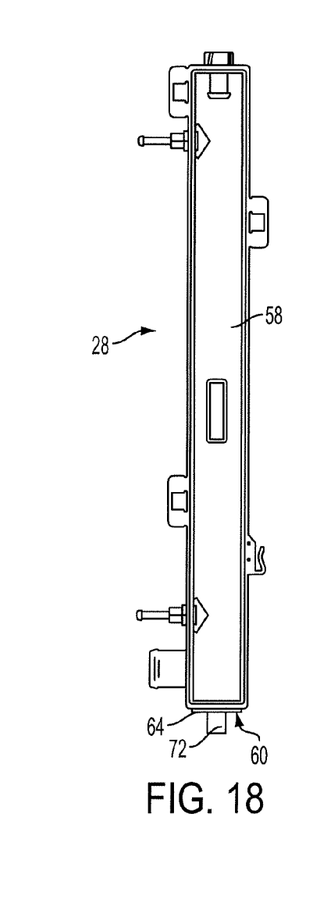
FIG. 18 is a left plan view of the right side tank of the radiator structure shown in FIG. 3 in accordance with the illustrated embodiment.
Figure 19:
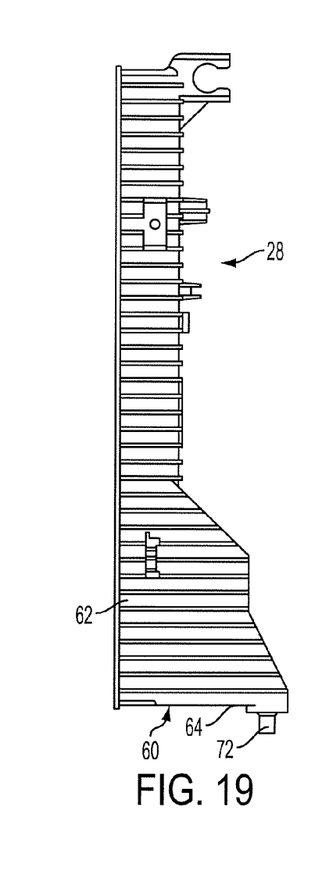
FIG. 19 is a front plan view of the right side tank of the radiator structure shown in FIG. 3 in accordance with the illustrated embodiment.
Figure 20:
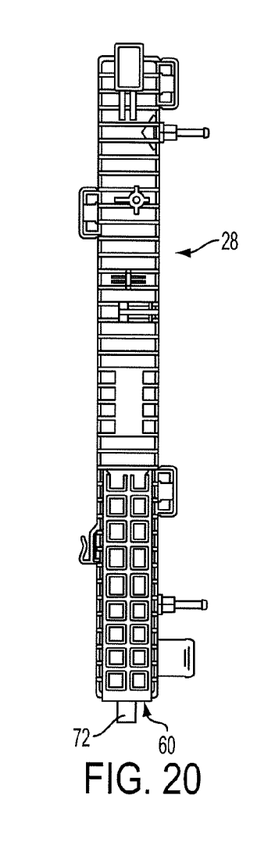
FIG. 20 is a right plan view of the right side tank of the radiator structure shown in FIG. 3 in accordance with the illustrated embodiment.
Figure 21:
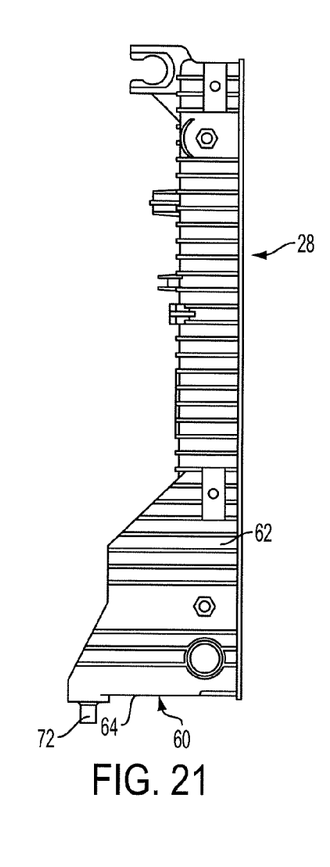
FIG. 21 is a rear plan view of the right side tank of the radiator structure shown in FIG. 3 in accordance with the illustrated embodiment.
Figure 22:
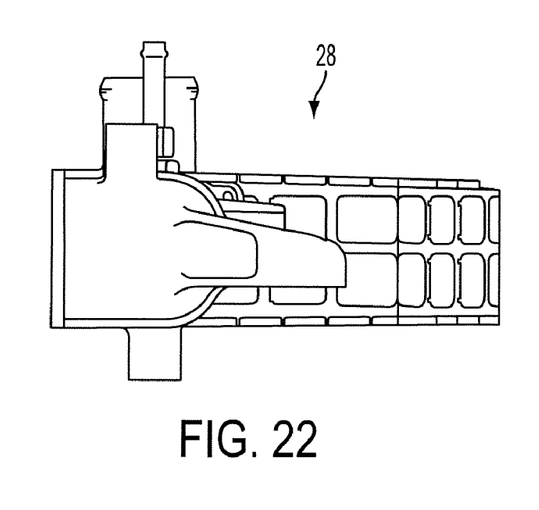
FIG. 22 is a top plan view of the right side tank of the radiator structure shown in FIG. 3 in accordance with the illustrated embodiment.
Figure 23:
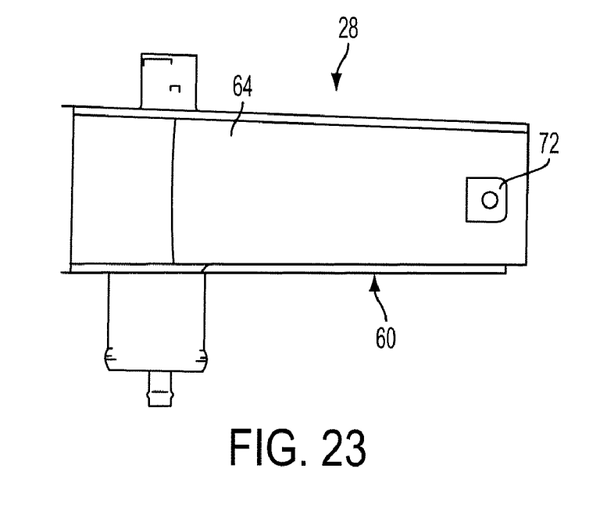
FIG. 23 is a bottom plan view of the right side tank of the radiator structure shown in FIG. 3 in accordance with the illustrated embodiment.

In addition, the first and second fluid tanks 26 and 28 include various mounting brackets, some of which are identified as brackets 30, 32, 34 and 36. These mounting brackets 30-36, as well as those not specifically identified, are of the type known in the art and used, for example, to attach the first and second fluid tanks 26 and 28 to the radiator structure 14, or to attach other components to the first and second fluid tanks 26 and 28. In this example, the first fluid tank 26 further includes a fluid inlet 38 that communicates with the interior 40 of the first fluid tank 26 (see FIG. 11). Coolant, such as radiator fluid, can be received into the interior 40 of the first fluid tank 26 via the fluid inlet 38 as would be understood by one skilled in the art. Accordingly, when the first fluid tank 26 is coupled to the first end 20 of the radiator core 18 by bolts or any other suitable fastening members, the fluid can flow between the interior 40 of the first fluid tank 26 and the interior of the radiator core 18.

As illustrated in FIGS. 3-6, and as further shown in FIGS. 7-12, a first lift assist contact member 42 is fixedly coupled to the first fluid tank 26 by, for example, a single bolt 44, or by any other suitable fastening device as known in the art. The first lift assist contact member 42 also has a drain port opening 46 for accommodating a drain port (not shown). The first lift assist contact member 42 in this example includes a bracket that can be made of metal or any other suitable material having sufficient strength and durability as would be appreciated by one skilled in the art. The first lift assist contact member 42 extends from the first fluid tank 26. At least a portion (e.g., the attachment portion 48) of the first lift assist contact member 42 is disposed directly vertically beneath the first fluid tank 26 when viewed in an orientation at which the FEM 12 are installed in the vehicle 10 (i.e., the "vehicle installed position of the vehicle radiator structure").

In this example, the first lift assist contact member 42 (e.g., bracket) includes the attachment portion 48 and a contact portion 50. The attachment portion 48 couples the first lift assist contact member 42 to the first fluid tank via bolts 44 and 46. The contact portion 50 extends from the attachment portion 48 in a direction away from the first end 20 of the radiator core 18 toward the second end 22 of the radiator core 18. The contact portion 50 includes a first lift assist contact point 52. For example, the contact portion 50 can include a continuous surface extending from the attachment portion 48. As shown in more detail in FIGS. 13-17, the contact portion 50 can include a plurality of extensions 54, with each of the extensions 54 having a respective edge 56 that is spaced apart from the cooling fin portion 24. The extensions 54 include a portion of the first lift assist contact point 52. In this example, the first lift assist contact point 52 is on bottom surfaces of the extensions 54 of the first lift assist contact member 42. The extensions 54 are angled to straddle the bottom corners of the cooling fin portion 24.

Specifically, the first lift assist contact point 52 is spaced apart from the cooling fin portion 24 and disposed directly vertically beneath the radiator core 18 when the radiator structure 14 is in the vehicle installed position. Accordingly, the first lift assist contact member 42 and, more particularly, the first lift assist contact point 52, acts as a first radiator core protection unit which prevent or at least minimize damage to the radiator core 18 and its cooling fin portion 24 by the lift assist device 16 when the lift assist device 16 is used to install the FEM 12 into the vehicle as discussed in more detail below.

Returning now to the second fluid tank 28, as discussed above, the second fluid tank 28 is fluidly coupled to the second end 22 of the radiator core 18. Further details of the second fluid tank 28 are shown in FIGS. 18-23. As indicated, the second fluid tank 28 further includes an interior 58 (see FIG. 18). Accordingly, when the second fluid tank 28 is fixedly coupled to the second end 22 of the radiator core 18 by bolts or any other suitable fastening members, the fluid can flow between the interior 58 of the second fluid tank 28 and the interior of the radiator core 18.

The second fluid tank 28 includes a second lift assist contact member 60. In this example, the second lift assist contact member 60 is formed as a tank extension which is part of the second fluid tank 28, and is thus unitary with the second fluid tank 28. In other words, in this illustrated embodiment, the second fluid tank 28 and the second lift assist contact member 60 are integrally formed as a one-piece, unitary member. Also, the second lift assist contact member 60 is separate and spaced laterally apart from the first lift assist contact member 42. In other words, as described above, in this example the first lift assist contact member 42 is coupled directly to the first fluid tank 26 without first being coupled to another portion of the vehicle radiator structure 14. Likewise, the second lift assist contact member 60 is coupled directly to the second fluid tank 28 without first being coupled to another portion of the vehicle radiator structure 14. Accordingly, the first and second lift assist contact members 42 and 60 are directly coupled to each other via the first and second fluid tanks 26 and 28 and the radiator core 18.

Figure 5:
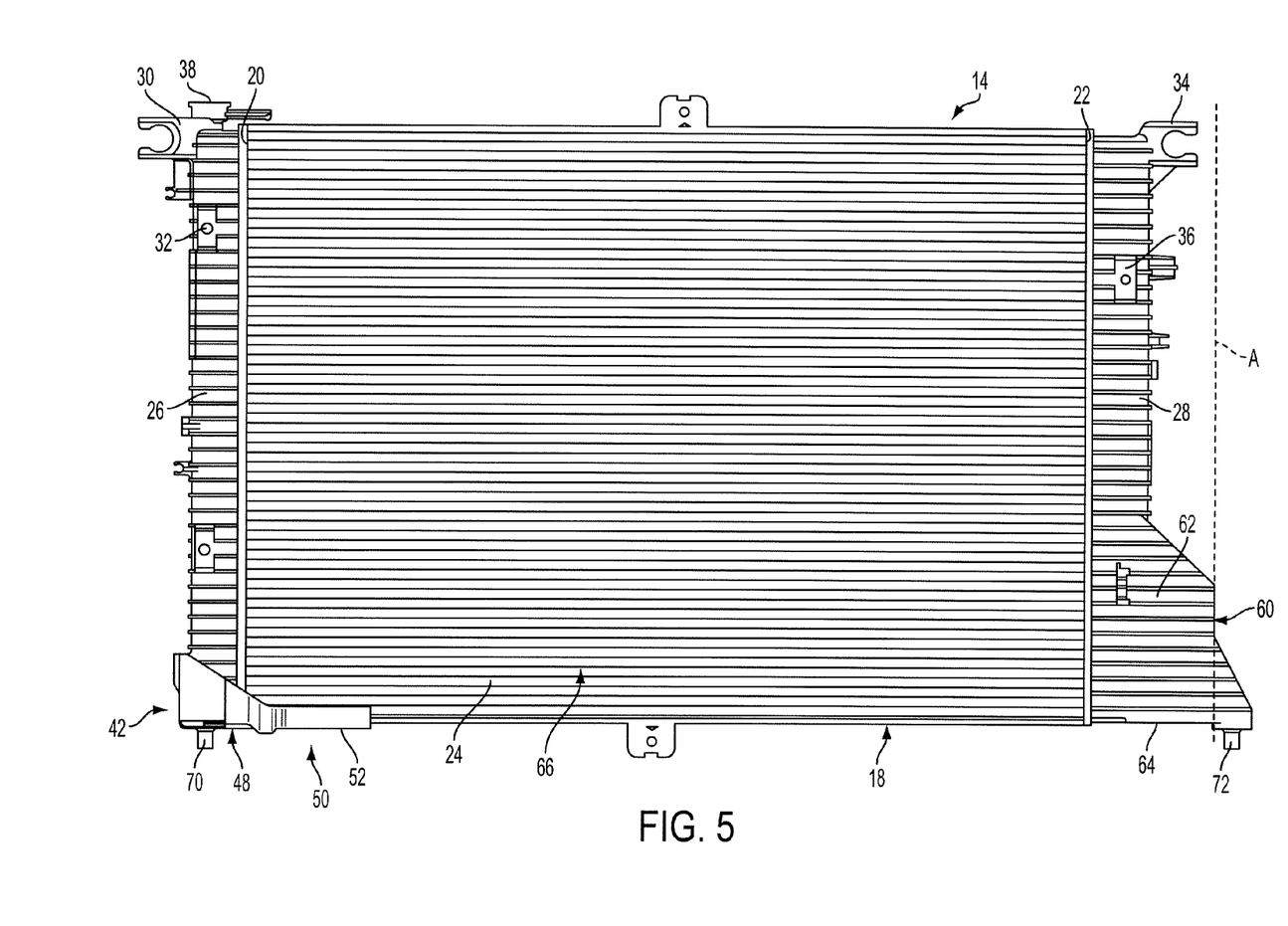
FIG. 5 is a front plan view of the radiator structure shown in FIG. 3 in accordance with the illustrated embodiment.
Figure 6:
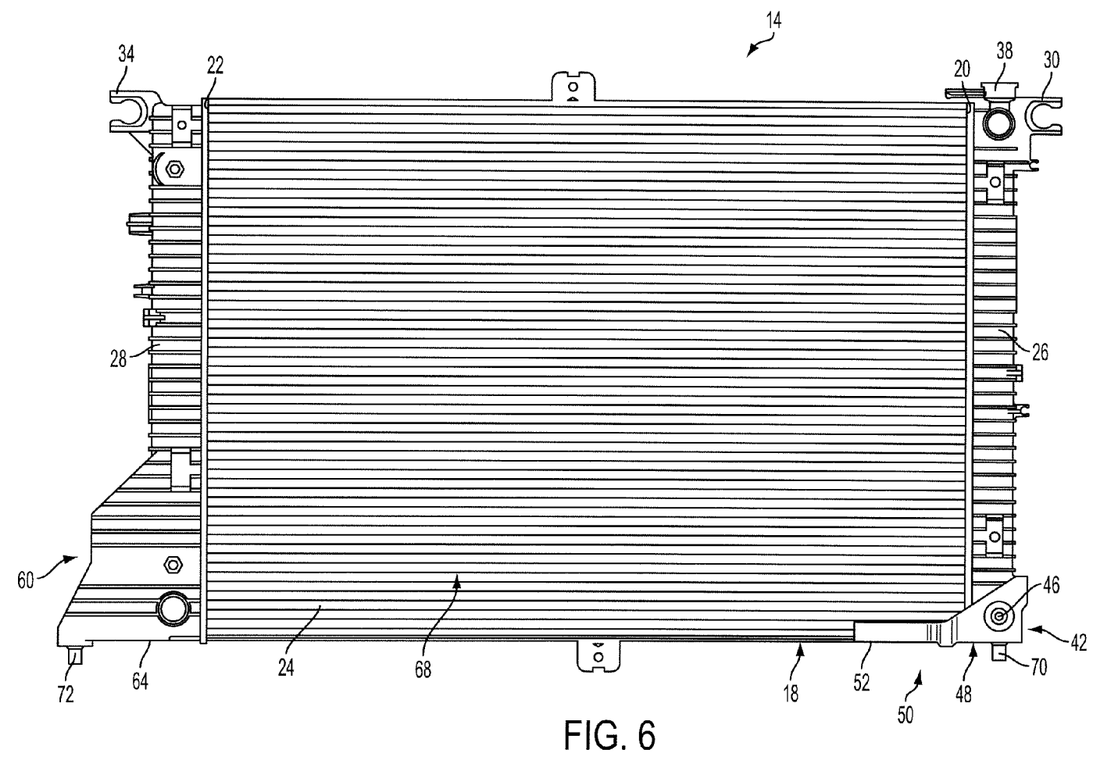
FIG. 6 is a rear plan view of the radiator structure shown in FIG. 3 in accordance with the illustrated embodiment.
Figure 7:
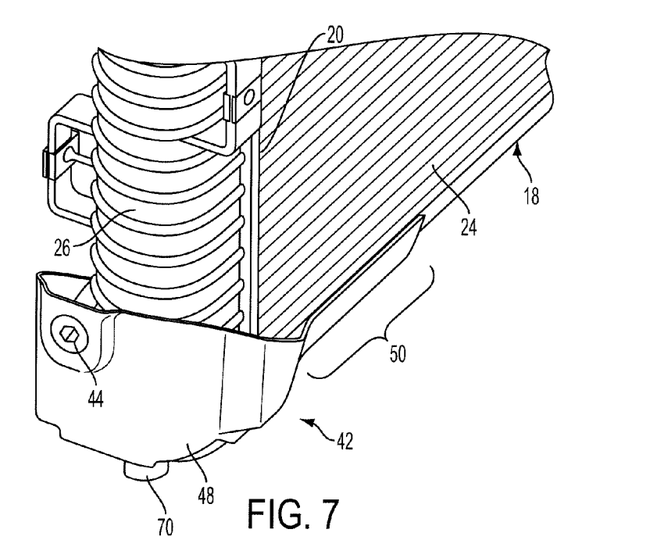
FIG. 7 is a detailed perspective view of the bottom left side of the radiator structure shown in FIG. 3, viewed downwardly toward a lift assist contact bracket attached to the left side tank of the radiator structure, in accordance with the embodiment.
Figure 8:
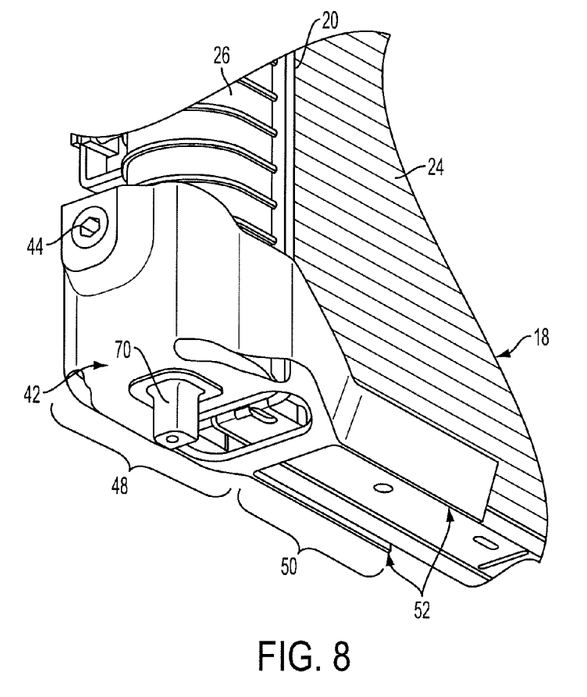
FIG. 8 is another detailed perspective view of the bottom left side of the radiator structure shown in FIG. 3, viewed upwardly toward the lift assist contact bracket attached to the left side tank of the radiator structure, in accordance with the illustrated embodiment.
Figure 9:
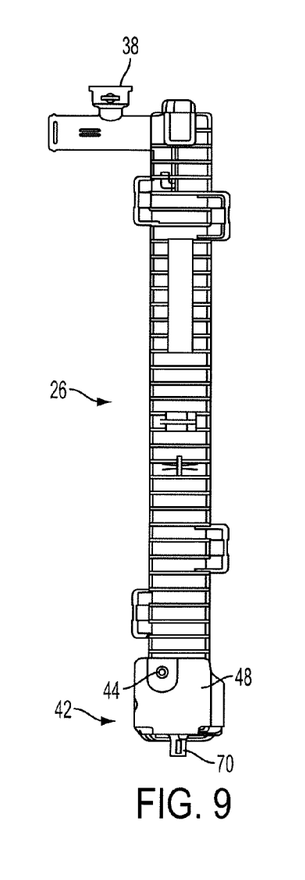
FIG. 9 is a left plan view of the left side tank of the radiator structure shown in FIG. 3 in accordance with the illustrated embodiment.
Figure 10:
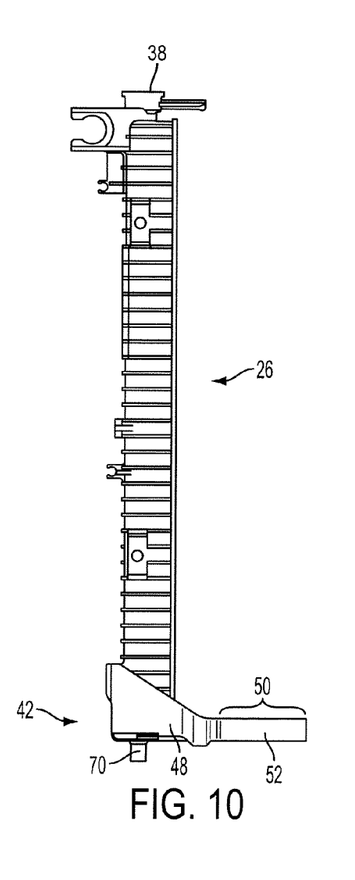
FIG. 10 is a front plan view of the left side tank of the radiator structure shown in FIG. 3 in accordance the illustrated embodiment.

As further illustrated in FIG. 5, the second lift assist contact member 60 extends laterally from the second fluid tank 28 with respect to the radiator core 18. The second lift assist contact member 60 includes a portion 62 with the lower or bottom edge of the portion 62 constituting a second lift assist contact point 64. The second lift assist contact point 64 is disposed directly vertically beneath the second fluid tank 28. Hence, the portion 62 of the second lift assist contact member 60 is also partially disposed directly vertically beneath the second fluid tank 28 when the vehicle radiator structure 14 is in the vehicle installed position. The second lift assist contact member 60 extends away from the second end 22 of the radiator core 18, and further extends in a direction away from the first end 20 of the radiator core 18.

The second lift assist contact member 60 further includes a second lift assist contact point 64 that is spaced apart from the cooling fin portion 24. For example, as shown in FIGS. 3-6, the radiator core 18 can be considered to have first and second faces that are on opposite sides of the cooling fin portion 24. The front or first face 66 is seen in the front views of FIGS. 4 and 5, and the rear or second face 68 is seen in the rear view of FIG. 6. The first and second faces each extends between the first and second ends of the radiator core, such that the first and second faces 66 and 68 and first and second ends 20 and 22 collectively define a radiator core area. Accordingly, it can be appreciated from FIGS. 3-6 that the second lift assist contact member 60 has a second lift assist contact point 64 that is spaced apart from the cooling fin portion 24 and disposed outside of vertical alignment with the radiator core area, while the first lift assist contact point 52 of the first lift assist contact member 42 is disposed below and in vertical alignment with the radiator core area.

Furthermore, in this example, the second lift assist contact point 64 is on what is considered a bottom surface of the second lift assist contact member 60 (e.g., the tank extension) when the vehicle radiator structure 14 is in the vehicle installed position. Accordingly, the second lift assist contact member 60 and, more particularly, the second lift assist contact point 64, act as a second radiator core protection unit which prevent or at least minimize damage to the radiator core 18 and its cooling fin portion 24 by the lift assist device 16 when the lift assist device 16 is used to install the FEM 12 into the vehicle as will now be discussed.

As can be appreciated from FIGS. 2-5, the first and second lift assist contact members 42 and 60 are positioned to have imposed thereon respective vertical lifting force vectors directly from the lift assist device 16. That is, when the FEM 12 is to be installed in the vehicle 10, the FEM 12 is positioned to be lifted by the lift assist device 16. When the lift assist device 16 contacts and lifts the FEM 12, the lift assist device 16 will come in contact the vehicle radiator structure 14. However, the spacing between the first and second lift assist contact members 42 and 60 corresponds with or substantially corresponds with the spacing between the lifting members of the lift assist device 16. Accordingly, the lift assist device 16 is operated so that the lifting members align with and contact the first and second lift assist contact members 42 and 60. Because the first and second lift assist contact members 42 and 60 are both positioned away from and vertically below the cooling fin portion 24 of the vehicle radiator structure 14, the lifting members of the lift assist device 16 contact the first and second lift assist contact members 42 and 60 without contacting the cooling fin portion 24. Thus, when lifting the vehicle radiator structure 14, the lifting members of the lift assist device 16 impose respective vertical lifting force vectors directly on the first and second lift assist contact members 42 and 60 without directly imposing a vertical lifting force vector on the cooling fin portion 24. Hence, damage to the cooling fin portion 24 by the lift assist device 16 is avoided.

It should also be noted that the arrangement of the second lift assist contact member 60, in particular, enables the radiator core 14 to have a reduced size as shown, for example, in FIG. 5. That is, in another type of FEM, the second fluid tank had a size and shape similar to that of the first fluid tank, but reversed so that the second fluid tank could connect to the opposite end of the radiator core 14. Accordingly, the radiator core 14 in that type of FEM extends to dotted line A, in order for the mounting posts 70 and 72 to be at the appropriate distance from each other to align with the corresponding mounting holes in the vehicle 10. However, in the present embodiment, because the second lift assist contact member 60 extends from the second fluid tank 28, the second lift assist contact member 60 positions the mounting post 72 that extends from the bottom of the second lift assist contact member 60 at the appropriate distance from the mounting post 70. This enables the mounting posts 70 and 72 to align with the corresponding mounting holes in the vehicle 10, while allowing the radiator core 14 to have a reduced width as shown in FIG. 5.

Figure 24:
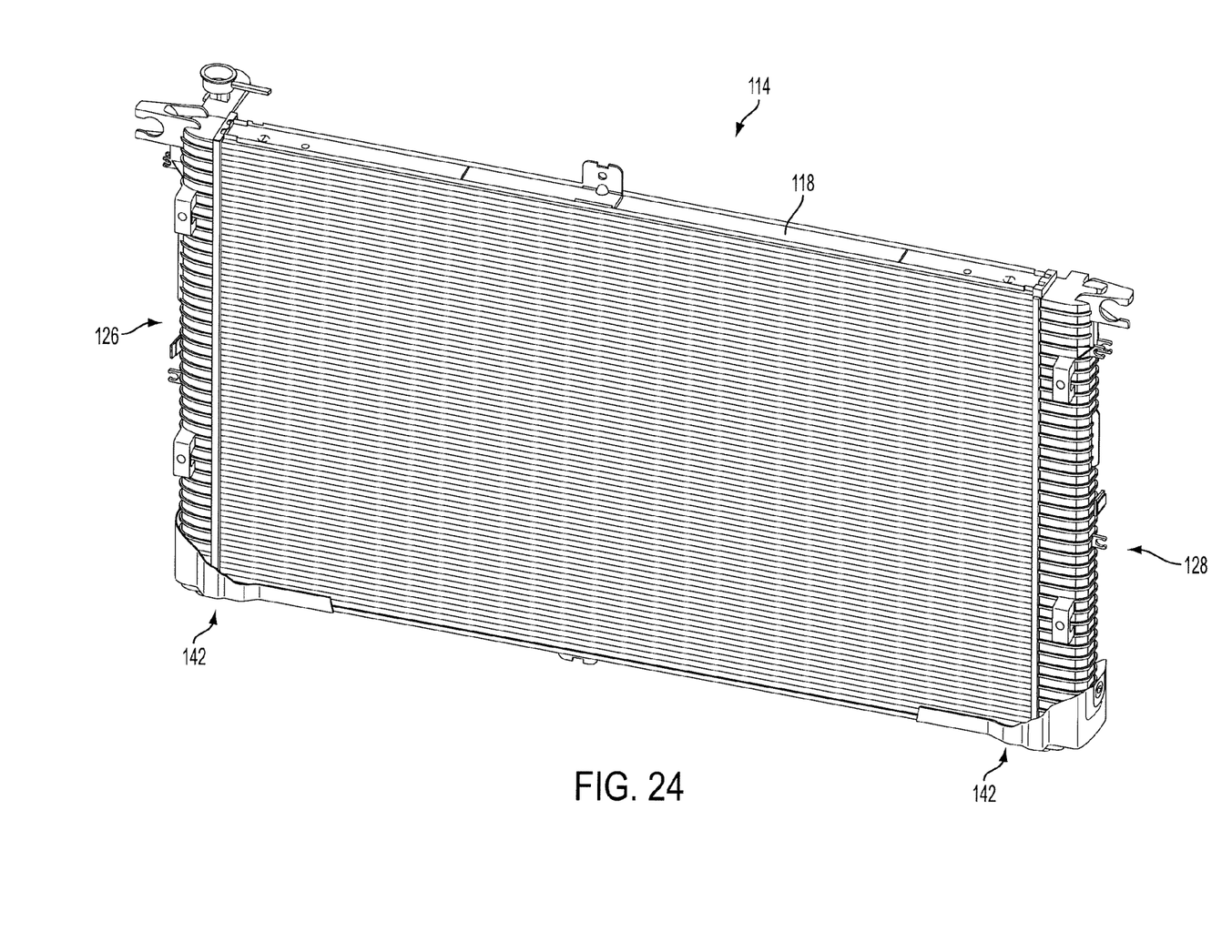
FIG. 24 is a perspective view of a radiator structure in accordance with another illustrated embodiment.

Referring now to FIG. 24, a radiator structure 114 is illustrated in accordance with another embodiment. In this alternative embodiment, the radiator structure 114 includes a radiator core 118 with a first fluid tank 126 coupled to a first end of the radiator core 118 and a second fluid tank 128 coupled to a second end of the radiator core 118. In this illustrated embodiment, each of the fluid tanks 126 and 128 has a lift assist contact member 142. The lift assist contact members 142 are substantially mirror images of each other. The lift assist contact member 142 on the passenger's side is identical to the lift assist contact member 42 illustrated in FIGS. 1 to 17. The fluid tanks 126 and 128 are also substantially mirror images of each other, but for the fluid tank 126 has a filler opening.

Figure 25:
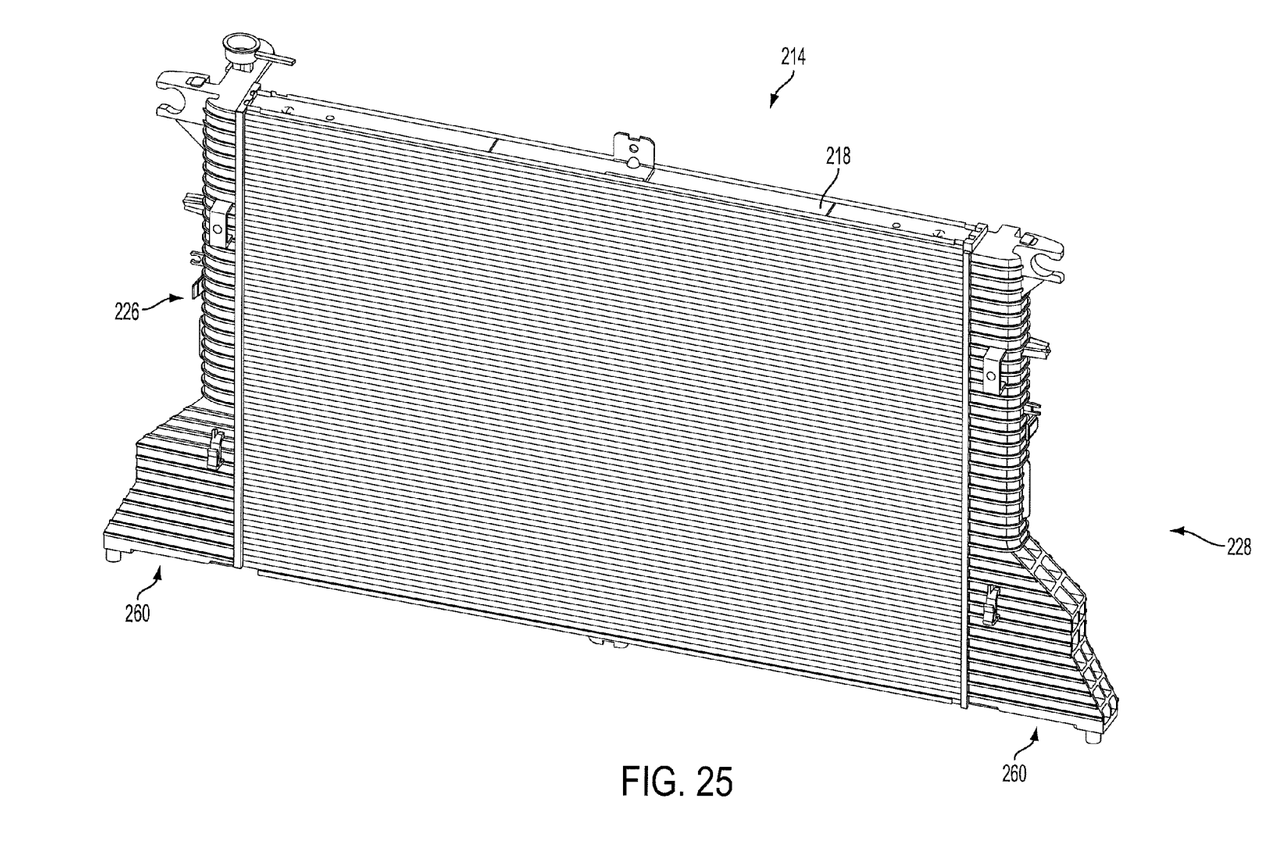
FIG. 25 is a perspective view of a radiator structure in accordance with yet another illustrated embodiment.

Referring now to FIG. 25, a radiator structure 214 is illustrated in accordance with yet another embodiment. In this alternative embodiment, the radiator structure 214 includes a radiator core 218 with a first fluid tank 226 coupled to a first end of the radiator core 218 and a second fluid tank 228 coupled to a second end of the radiator core 218. In this illustrated embodiment, each of the fluid tanks 226 and 228 has a lift assist contact member 260. The lift assist contact members 260 are substantially mirror images of each other. The lift assist contact member 260 on the driver's side is identical to the lift assist contact member 60 illustrated in FIGS. 1 to 6 and 18 to 23 The fluid tanks 226 and 228 are also substantially mirror images of each other, but for the fluid tank 226 has a filler opening.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle radiator structure. Accordingly, these terms, as utilized to describe the present invention should be interpreted relative to a vehicle equipped with the vehicle radiator structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle radiator structure comprising:
   a radiator core having a first end, a second end, a bottom edge, and a cooling fin portion disposed between the first and second ends;
   a first fluid tank coupled to the first end of the radiator core; and
   a first lift assist contact member coupled to the first fluid tank and having a contact portion extending in a direction away from the first end, the first lift assist contact member being a bracket having an attachment portion attached to the first fluid tank, and the contact portion of the first lift assist contact member extending from the attachment portion in a direction toward the second end of the radiator core.

2. The vehicle radiator structure according to claim 1, wherein
   the first lift assist contact member has a first lift assist contact point that is spaced apart from the cooling fin portion and disposed directly vertically beneath the radiator core in the vehicle installed position.

3. The vehicle radiator structure according to claim 2, wherein
   the first lift assist contact point is disposed on a bottom surface of the first lift assist contact member in the vehicle installed position.

4. The vehicle radiator structure according to claim 1, further comprising
   a second fluid tank coupled to the second end of the radiator core; and
   a second lift assist contact member coupled to the second fluid tank and having a contact portion extending in a direction away from the second end.

5. The vehicle radiator structure according to claim 4, wherein
   the second lift assist contact point is disposed on a bottom surface of the second lift assist contact member in the vehicle installed position.

6. The vehicle radiator structure according to claim 4, wherein
   the second lift assist contact member is a bracket having an attachment portion attached to the second fluid tank, and the contact portion of the second lift assist contact portion extends from the attachment portion of the second lift assist contact member.

7. The vehicle radiator structure according to claim 4, wherein
   the second lift assist contact member is a tank extension integrally formed with the second fluid tank.

8. The vehicle radiator structure according to claim 4, wherein
   the first and second lift assist contact members are positioned to have imposed thereon respective vertical lifting force vectors directly from a lift assist device that is separate from the vehicle radiator structure.

9. A vehicle radiator structure comprising:
   a radiator core having a first end, a second end, and a cooling fin portion disposed between the first and second ends;
   a first fluid tank fluidly coupled to the first end of the radiator core;
   a second fluid tank fluidly coupled to the second end of the radiator core;
   a first lift assist contact member extending from the first fluid tank with at least a portion of the first lift assist contact member being disposed directly vertically beneath the first fluid tank in a vehicle installed position of the vehicle radiator structure, the first lift assist contact member including a bracket that is coupled to the first fluid tank; and
   a second lift assist contact member being separate and spaced apart from the first lift assist contact member, the second lift assist contact member extending from the second fluid tank with at least a portion of the second lift assist contact member being in lateral alignment with the first lift assist contact member and the radiator core.

10. The vehicle radiator structure according to claim 9, wherein
the bracket includes an attachment portion that couples the bracket to the first fluid tank, and a contact portion that extends from the attachment portion in a direction away from the first end of the radiator core toward the second end of the radiator core and includes a first lift assist contact point.

11. The vehicle radiator structure according to claim 10, wherein
the contact portion includes a continuous surface extending from the attachment portion.

12. The vehicle radiator structure according to claim 10, wherein
the first lift assist contact point is on a bottom surface of the bracket in the vehicle installed position.

13. A vehicle radiator structure comprising:
a radiator core having a first end, a second end, and a cooling fin portion disposed between the first and second ends;
a first fluid tank fluidly coupled to the first end of the radiator core;
a second fluid tank fluidly coupled to the second end of the radiator core;
a first lift assist contact member extending from the first fluid tank with at least a portion of the first lift assist contact member being disposed directly vertically beneath the first fluid tank in a vehicle installed position of the vehicle radiator structure; and
a second lift assist contact member being separate and spaced apart from the first lift assist contact member, the second lift assist contact member extending from the second fluid tank with at least a portion of the second lift assist contact member being in lateral alignment with the first lift assist contact member and the radiator core, the second lift assist contact member including a tank extension that is on the second fluid tank and extends away from the second end.

14. The vehicle radiator structure according to claim 13, wherein
the tank extension further extends away from the first end.

15. The vehicle radiator structure according to claim 13, wherein
the tank extension is unitary with the second fluid tank.

16. The vehicle radiator structure according to claim 13, wherein
the tank extension includes a second lift assist contact point that is spaced apart from the cooling fin portion.

17. The vehicle radiator structure according to claim 16, wherein
the second lift assist contact point is on a bottom surface of the tank extension in the vehicle installed position.

18. A vehicle radiator structure comprising:
a radiator core having a first end, a second end, a bottom edge, and a cooling fin portion disposed between the first and second ends;
a first fluid tank fluidly coupled to the first end of the radiator core;
a second fluid tank fluidly coupled to the second end of the radiator core;
a first lift assist contact member extending from the first fluid tank with at least a portion of the first lift assist contact member being disposed directly vertically beneath the first fluid tank in a vehicle installed position of the vehicle radiator structure; and
a second lift assist contact member being separate and spaced apart from the first lift assist contact member, the second lift assist contact member extending from the second fluid tank with at least a portion of the second lift assist contact member being in lateral alignment with the first lift assist contact member and the radiator core;
wherein the first lift assist contact member is coupled directly to the first fluid tank without being coupled to another portion of the vehicle radiator structure, and the second lift assist contact member is coupled directly to the second fluid tank without being coupled to another portion of the vehicle radiator structure, such that the first and second lift assist contact members are directly coupled to each other via the first and second fluid tanks and radiator core.

19. A vehicle radiator structure comprising:
a radiator core having a first end, a second end, a bottom edge, and a cooling fin portion disposed between the first and second ends;
a first fluid tank coupled to the first end of the radiator core; and
a first lift assist contact member coupled to the first fluid tank and having a contact portion extending in a direction away from the first end, the first lift assist contact member being a bracket having an attachment portion attached to the first fluid tank, and the contact portion of the first lift assist contact member extending from the attachment portion and including a first arm and a second arm spaced apart from the first arm.

20. The vehicle radiator structure according to claim 19, wherein
the first arm and the second arm each have an upper edge positioned vertically above the bottom edge of the radiator core and a lower edge positioned vertically below the bottom edge of the radiator core, with a gap defined between the bottom edge of the first arm and the bottom edge of the second arm.

21. The vehicle radiator structure according to claim 20, wherein
the first and second arms extend from the attachment portion in a direction toward the second end of the radiator core, the upper edge of the first arm is positioned forward of the radiator core, the upper edge of the second arm is positioned rearward of the radiator core, and the bottom edges of the first arm and the second arm are positioned directly below the bottom edge of the radiator core.

22. A vehicle radiator structure comprising:
a radiator core having a first end, a second end, a bottom edge, and a cooling fin portion disposed between the first and second ends;
a first fluid tank coupled to the first end of the radiator core; and
a first lift assist contact member configured as a tank extension integrally formed with the first fluid tank and having a contact portion extending in a direction away from the first end.

23. The vehicle radiator structure according to claim 22, wherein
the contact portion of the first lift assist contact member extends from the first fluid tank in a direction away from the second end of the radiator core.

* * * * *